(12) United States Patent
Sedlacek et al.

(10) Patent No.: US 12,055,197 B2
(45) Date of Patent: Aug. 6, 2024

(54) CENTER CORD-LINE V-BELT

(71) Applicant: GATES CORPORATION, Denver, CO (US)

(72) Inventors: Douglas R. Sedlacek, Centennial, CO (US); William Buchholz, Springdale, AZ (US); Bobbie E. South, New Bloomfield, MO (US); Mark L. Dutton, Columbia, MO (US)

(73) Assignee: GATES CORPORATION, Denver, CO (US)

( * ) Notice: Subject to any disclaimer, the term of this patent is extended or adjusted under 35 U.S.C. 154(b) by 194 days.

(21) Appl. No.: 17/628,154

(22) PCT Filed: Jul. 23, 2020

(86) PCT No.: PCT/US2020/043348
§ 371 (c)(1),
(2) Date: Jan. 18, 2022

(87) PCT Pub. No.: WO2021/016495
PCT Pub. Date: Jan. 28, 2021

(65) Prior Publication Data
US 2022/0316555 A1 Oct. 6, 2022

Related U.S. Application Data

(60) Provisional application No. 62/877,763, filed on Jul. 23, 2019.

(51) Int. Cl.
*F16G 5/22* (2006.01)
*F16G 5/08* (2006.01)
(52) U.S. Cl.
CPC ...... *F16G 5/22* (2013.01); *F16G 5/08* (2013.01)

(58) Field of Classification Search
CPC ..... F16G 5/06; F16G 5/08; F16G 1/10; F16G 1/08; F16G 5/04; F16G 5/00; F16G 1/06; F16G 5/22
(Continued)

(56) References Cited

U.S. PATENT DOCUMENTS 3,090,716 A * 5/1963 Stevens .................. F16G 5/06
8/115.67
3,869,933 A * 3/1975 Dorf ...................... F16G 5/14
474/263
(Continued)

FOREIGN PATENT DOCUMENTS

JP 2006349002 A 12/2006

OTHER PUBLICATIONS

European Patent Office, International Search Report PCT application No. PCT/US2020/043348, mailing date: Nov. 5, 2020.

*Primary Examiner* — Henry Y Liu
(74) *Attorney, Agent, or Firm* — Kevin J. Aiken, Esq.

(57) ABSTRACT

A center cord-line V-belt with a radially centered cord line of helically wound tensile cord embedded in a very high-modulus adhesion gum, an overcord layer, and an undercord layer. The adhesion gum has a substantially isotropic modulus, while the overcord and undercord layers have anisotropy in with-grain and cross-grain moduli. The overcord and undercord cross-grain moduli are less than the adhesion gum modulus. The anisotropic moduli are the result of oriented short fibers and the with-grain modulus is oriented axially in the belt. The adhesion gum preferably has no short fiber. The belt preferably has no reinforcing fabric layer and no fabric wrap. The adhesion gum, overcord layer and undercord layer are preferably based on an ethylene-alpha-olefin elastomer, with peroxide cure, reinforcing filler, and metal salt of an α-β-unsaturated organic acid. The belt may have (Continued)

notches on one or both of the inner and outer radial surfaces for additional flexibility.

14 Claims, 3 Drawing Sheets

(58) Field of Classification Search
USPC .............................. 474/260, 261, 263, 265
See application file for complete search history.

(56) References Cited

U.S. PATENT DOCUMENTS

| | | | | |
|---|---|---|---|---|
| 3,941,005 | A * | 3/1976 | Gardiner, III | F16G 5/166 |
| | | | | 474/262 |
| 3,987,684 | A * | 10/1976 | Fisher | B29D 29/10 |
| | | | | 474/262 |
| 4,296,640 | A * | 10/1981 | Nosaka | F16G 5/08 |
| | | | | 474/262 |
| 6,595,883 | B1 * | 7/2003 | Breed | F16G 5/06 |
| | | | | 156/137 |
| 6,616,558 | B2 * | 9/2003 | South | F16G 1/28 |
| | | | | 156/137 |
| 2002/0042317 | A1 * | 4/2002 | South | F16G 1/28 |
| | | | | 474/263 |
| 2002/0128105 | A1 * | 9/2002 | Hedberg | F16G 5/06 |
| | | | | 474/260 |
| 2003/0073533 | A1 * | 4/2003 | Knutson | F16G 5/08 |
| | | | | 474/263 |
| 2003/0078125 | A1 * | 4/2003 | Knutson | F16G 1/10 |
| | | | | 474/263 |
| 2004/0009839 | A1 * | 1/2004 | Edwards | F16G 5/06 |
| | | | | 474/263 |
| 2004/0033857 | A1 * | 2/2004 | Welk | F16G 5/20 |
| | | | | 474/263 |
| 2005/0119082 | A1 * | 6/2005 | Lofgren | D06M 15/41 |
| | | | | 156/137 |
| 2006/0213174 | A1 * | 9/2006 | Wu | F16G 1/10 |
| | | | | 57/237 |
| 2006/0293140 | A1 * | 12/2006 | Daugherty | F16G 5/06 |
| | | | | 156/137 |
| 2007/0155566 | A1 * | 7/2007 | Wu | F16G 5/20 |
| | | | | 474/263 |
| 2007/0249451 | A1 * | 10/2007 | Wu | F16G 1/28 |
| | | | | 474/263 |
| 2007/0249452 | A1 * | 10/2007 | South | F16G 5/20 |
| | | | | 474/263 |
| 2007/0259746 | A1 * | 11/2007 | Wu | F16G 1/28 |
| | | | | 474/260 |
| 2009/0081473 | A1 * | 3/2009 | Ohno | F16G 1/08 |
| | | | | 156/137 |
| 2010/0279808 | A1 * | 11/2010 | Fan | F16G 5/20 |
| | | | | 474/205 |
| 2011/0028257 | A1 * | 2/2011 | Sealey | C08K 3/04 |
| | | | | 474/263 |
| 2011/0070989 | A1 * | 3/2011 | Duke | D02G 3/447 |
| | | | | 474/260 |
| 2011/0269588 | A1 * | 11/2011 | Fleck | F16G 1/10 |
| | | | | 474/260 |
| 2014/0073468 | A1 * | 3/2014 | Knutson | D02G 3/44 |
| | | | | 57/17 |
| 2015/0133250 | A1 * | 5/2015 | Wu | F16G 1/10 |
| | | | | 474/261 |
| 2016/0333963 | A1 * | 11/2016 | South | F16G 5/06 |
| 2017/0023098 | A1 * | 1/2017 | Burlett | F16G 5/20 |

* cited by examiner

CENTER CORD-LINE V-BELT

BACKGROUND OF THE INVENTION

This invention relates generally to a center cord-line V-belt without fabric reinforcements, more particularly to a V-belt with very-high-modulus, adhesion gum and lesser-modulus, fiber-loaded overcord and undercord.

Center cord-line ("CCL") V-belts have been known for decades. With the cord line centered in the belt, a cured belt slab or sleeve can be cut into individual belts alternating inverted and upright belts with minimal or no material waste. A central cord line can also make the V-belt more stable, i.e., less likely to roll over in use. However, because of the lower cord line, CCL V-belts have been known as "lower quality" belts (i.e., lower load carrying capability), compared to modern V-belts with a cord line closer to the top of the belt. Because of the V shape, fewer cords can be fit across the belt width at a central cord line than at a cord line near the wider top of the belt, leading to lower tensile strength. The centered cord also has less material under it for support, tending to reduce transverse stiffness and tending to cause the edge cords to elongate much more than the cords in the center (cupping or sagging) resulting in earlier belt failure. With more material in the tension section above the cord, center cord line belts can be more prone to back cracking. Prior solutions to these problems generally involved using reinforcing fabric layers to stiffen the belt, but that increases the belt cost and adds manufacturing steps. As a result of these problems, center cord-line belts have been somewhat disfavored for 30 years or more.

Exemplary center cord-line V-belts are disclosed in U.S. Pat. Nos. 3,941,005 and 3,869,933, and exemplary high cord-line belts are disclosed in U.S. Pat. Nos. 4,231,826 and 3,869,933. The latter patent describes the problem of the sagging cord line in CCL V-belts and proposes the solutions of adding fabric layers or raising the cord line.

Belts based on EPDM and other ethylene-alpha-olefin elastomer materials are disclosed in U.S. Pat. Nos. 5,610,217 and 6,616,558.

Notched or cogged V-belts and methods are disclosed in U.S. Pat. Nos. 4,106,966 and 2,016,140.

A state-of-the-art EPDM CCL V-belt with many textile laminations is disclosed by The Timken Company, in the brochure, "Carlisle Super II V-Belt for HVAC," 2017, Order No. 10952.

What is needed is a center cord-line V-belt that can be made with minimal scrap, but has good enough performance and low enough cost to be commercially feasible. What is needed is a CCL V-belt without fabric reinforcement.

SUMMARY OF THE INVENTION

The present invention is directed to systems and methods which provide more flexible and more cost effective CCL V-belts with good performance characteristics that can be manufactured using methods producing minimal wasted material.

The invention relates to a center cord-line V-belt with a radially centered cord line of helically wound tensile cord embedded in a very high-modulus adhesion gum, an overcord layer, and an undercord layer. The adhesion gum has a substantially isotropic modulus, while the overcord and undercord layers have unequal with-grain and cross-grain moduli. The overcord and undercord cross-grain moduli are less than the adhesion gum modulus. The anisotropic moduli are the result of oriented short fibers and the with-grain modulus is oriented axially in the belt. The adhesion gum preferably has no short fiber. The belt preferably has no reinforcing fabric layer and no fabric wrap. The adhesion gum, overcord layer and undercord layer are preferably based on an ethylene-alpha-olefin elastomer, with peroxide cure, reinforcing filler, and metal salt of an $\alpha$-$\beta$-unsaturated organic acid.

The preferred construction maximizes the balance or ratio of axial or transverse stiffness and bending stiffness. The belt may have notches on one or both of the inner and outer radial surfaces, which further enhance the belt flexibility.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The invention relates to a V-belt, defined as an endless power transmission belt with a trapezoidal cross section, axial sides being angled in a V or partial V arrangement. A V-belt according to the invention has an elastomeric belt body and longitudinally extending, helically wound, tensile cords embedded therein. A center cord line V-belt has the tensile cords in a layer substantially, approximately in the middle, radially, of the belt body. As mentioned in the background, the performance of a V-belt depends on having a high tensile strength for pulling the loads in a belt drive, and high transverse stiffness for resisting the wedging forces on the V-angled sides when it is in a V-sheave or pulley, and good longitudinal flexibility to minimize energy consumption and heat build-up from flexing around the pulleys in the belt drive. These three goals are often counterproductive. Rubber compounds with high transverse stiffness are often equally stiff in the longitudinal direction. Even anisotropic rubber compounds do not provide a sufficient difference (or high enough stiffness ratio) between transverse and longitudinal stiffness. Use of various textiles to stiffen the belt may be insufficient as well, but in addition will certainly increase the cost and manufacturing complexity of the belt. Usually increased stiffness also requires the cord line to be shifted toward the top (radially outer surface) of the belt where the tensile strains are the highest during flexing. Thus, the manufacturing advantages of a CCL V-belt are difficult to obtain while maintaining or improving the performance or quality of the belt.

According to embodiments of the invention, a CCL V-belt is provided with high transverse stiffness, high tensile strength, good flexibility, leading to good belt life on flex and load capacity tests. The inventive belts have no fabric or textile reinforcement other than the tensile cord itself. Having a center cord line permits manufacturing efficiencies and minimum waste. The central tensile cord layer includes the helically wound tensile cord and a very high-modulus adhesion gum. The remainder of the belt body (i.e., the overcord and the undercord layers) include a fiber-loaded high-modulus rubber compound.

FIGS. 1-4 show four embodiments of the inventive V-belt.

Figure 1:
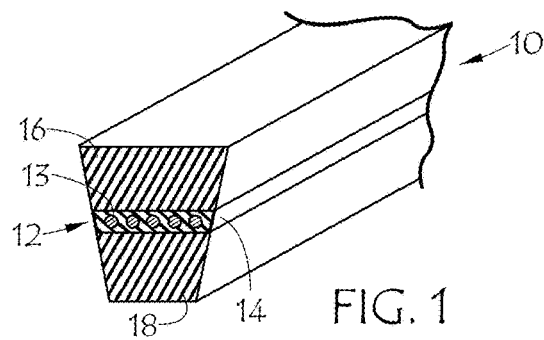
FIG. 1 is a partially fragmented perspective view of a first embodiment of the invention.

A first embodiment of the invention is illustrated in FIG. 1. In FIG. 1, V-belt 10 includes tensile layer 12 which includes tensile cord 13 and very high-modulus compound 14 which will be referred to herein as the adhesion gum 14. V-belt 10 also includes overcord 16 and undercord 18.

Figure 2:
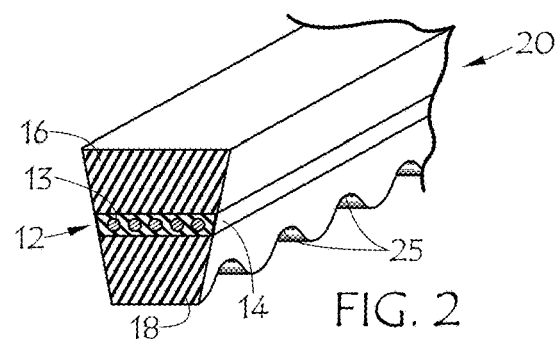
FIG. 2 is a partially fragmented perspective view of a second embodiment of the invention.

A second embodiment of the invention is illustrated in FIG. 2. In FIG. 2, V-belt 20 includes tensile layer 12 which includes tensile cord 13 and adhesion gum 14. V-belt 10 also includes overcord 16 and undercord 18. V-belt 20 also includes a single set of notches 25 which are on the inside or bottom surface of the belt. The notches are alternating depressions or troughs and cogs or tooth-like projections. These alternating depressions and projections may preferably follow a generally sinusoidal path as illustrated which may serve to distribute and minimize bending stresses as the belt passes around pulleys or sheaves during its operation.

Figure 3:
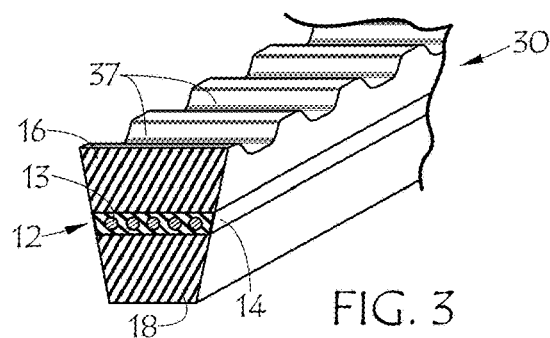
FIG. 3 is a partially fragmented perspective view of a third embodiment of the invention.

A third embodiment of the invention is illustrated in FIG. 3. In FIG. 3, V-belt 30 includes tensile layer 12 which includes tensile cord 13 and adhesion gum 14. V-belt 10 also includes overcord 16 and undercord 18. V-belt 30 also includes a single set of notches 37 which are on the outside or top surface of the belt.

Figure 4:
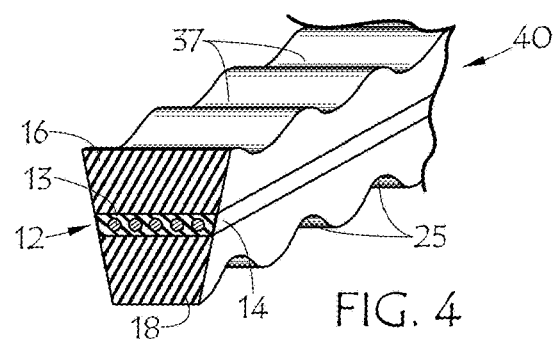
FIG. 4 is a partially fragmented perspective view of a fourth embodiment of the invention.

A fourth embodiment of the invention is illustrated in FIG. 4. In FIG. 4, V-belt 40 includes tensile layer 12 which includes tensile cord 13 and adhesion gum 14. V-belt 10 also includes overcord 16 and undercord 18. V-belt 20 also includes two sets of notches 25 and 37 in the undercord and overcord, respectively.

In each embodiment, the tensile cord layer includes the tensile cord and the very-high-modulus, rubber compound, which is also referred to herein as the "adhesion gum." It should be understood that adhesion to the tensile cord and the undercord and overcord is just one of the functions of the adhesion gum. This compound is also the key to high transverse stiffness. The high-modulus, tensile cord layer is restricted to a relatively thin layer centered in the belt body which helps the tensile layer remain sufficiently flexible in the longitudinal direction. The tensile cord layer thickness may be only slightly thicker than the cord diameter, up to several times the cord diameter. For cords on order of about 1-mm in diameter, the tensile cord layer may range from about 1-mm to about 7-mm in thickness, or from 1.5-mm to 5-mm in thickness, or from 2 to 3-mm thick. For other sizes of V-belts and cords, the tensile cord layer thickness, including both tensile cord and adhesion gum, could range from 1 to 7, or 1 to 5, or 1.5 to 5, or 2 to 3 cord diameters.

The skilled practitioner would also readily appreciate that in the several FIGS. 1-4, the adhesive gum 14 is illustrated in exaggerated form in order to visually distinguish it from the other elastomeric portions of the belt. In actuality, the cured composite is frequently visually indistinguishable from the surrounding elastomeric belt body portion except in certain cases, e.g., where one and not the other of the adhesive gum 14 and the undercord 18 and/or overcord 16 are fiber loaded. The adhesion gum furthermore need not form a perfectly flat interface at the overcord or undercord or resemble the proportions that might be suggested by the FIGS. Depending on how the adhesion gum is applied and the belt molded, the adhesion gum may include lobes, or other shapes of flow lines instead of the smooth interface represented in the figures.

The tensile cord may be any desired high-modulus fiber material known for V-belts. The tensile cord could be polyester, nylon, fiberglass, carbon fiber, aramid (either para-, meta-, or co-poly-aramid), steel wire or cable, or combinations thereof. Polyester, nylon, and aramid are preferred cord materials. The tensile cord may be any desired construction, i.e., yarn style, twist levels, plied or cabled, etc. The tensile cord may be treated with any desired sizing, coating, adhesive and the like.

The tension section, or overcord 16, of the belt body is radially outside of the tensile cord layer, i.e., the top layer of the belt when the belt is in the upright position. The compression section, or undercord 18, of the belt body is radially inward of the tensile cord layer, i.e., the bottom layer when the belt is in the upright orientation. Thus the rubber compound in the tension section is referred to as the overcord. The rubber compound in the compression section is referred to as the undercord. The overcord is approximately the same thickness as the undercord, since the tensile cord layer is centrally located. The overcord and undercord may be of the same composition, so that whether an inverted belt or an upright belt is cut from the same sleeve, it will have the same composition and comparable properties. Preferably the under cord and overcord compounds are the same composition. Preferably the under cord and overcord compounds possess greater flexibility and crack resistance than the adhesion gum. Generally, greater flexibility requires lower modulus, higher elongation, and the like. The overcord and undercord compound may be selected to give a desired coefficient of friction ("COF") between the angled sides and a sheave. The COF of the overcord and undercord will dominate the frictional properties of the V-belt because of their higher surface area, relative to the adhesion gum in the tensile cord layer. Short fibers may be included in the overcord and undercord compounds. Short fibers can help provide the desired COF. When oriented axially (i.e. transversely in the belt), the short fibers can help provide transverse stiffness while having a minimal impact on longitudinal flexibility.

Figure 5:
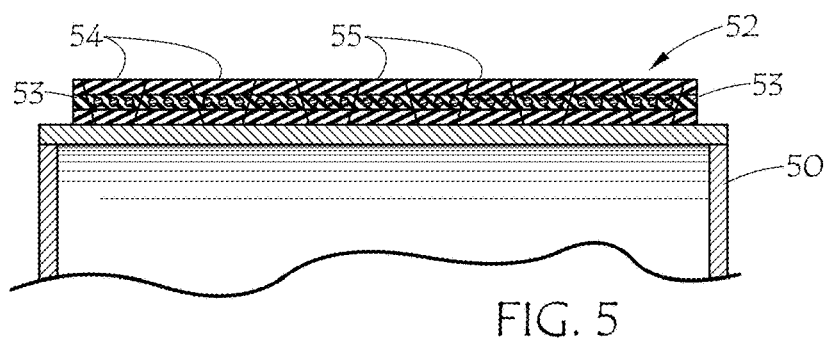
FIG. 5 is a partially fragmented view at a point in the process of manufacturing an embodiment of the invention.

FIG. 5 illustrates a point in one possible manufacturing process for making the inventive CCL V-belts. A mandrel 50 may be provided on which to build up the belt materials. A cylindrical mandrel (with a smooth cylindrical surface) may be used to make the V-belts having one or both of the inner and outer surfaces smooth. A grooved or wavy mandrel may be used to build up and/or mold a notched embodiment. Alternately, a grooved or wavy matrix may be wrapped around a smooth mandrel to mold a notched embodiment. One of the undercord or overcord may be applied to the mandrel first. Then the materials of the tensile cord layer may be applied thereon. The tensile cord layer 12 may be applied in a number of ways. The tensile cord may be helically wound onto the mandrel. The tensile cord may include two cords, such as an "S" twisted cord and a "Z" twisted cord, applied simultaneously in parallel fashion. The adhesion gum 14 may be applied before the tensile cord or after the tensile cord or as two layers, one before and one after the tensile cord. Finally the other of the overcord and undercord is applied thereon. The resulting built-up material layers is called the belt slab or belt sleeve 52.

The belt sleeve 52 may be cured on the mandrel 50 or moved to a second mandrel or mold for curing (or vulcanization). Curing may be accomplished in any way known in the art. A typical method is to place a cure bag around the belt sleeve on the mandrel and apply heat and pressure sufficient to cure the belt sleeve. The cure bag may be grooved or wavy if notches are desired. Alternately, a grooved or wavy matrix may be wrapped around the belt slab before placing in a smooth cure bag if notches are desired. After curing, the belt sleeve may be removed from the mandrel or mold, or processed further on the mandrel or mold. The most important further processing step is the cutting of the belt sleeve to form individual CCL V-belts. The preferred method is to alternate the cutting angle as shown in FIG. 5, so that upright belts 54 are cut alternately with inverted belts 55. This cutting approach makes maximum use of the materials, resulting in only two partial belt end pieces 53 as waste from each belt sleeve. The cutting may be carried out on separate cutting devices to avoid damaging the mandrel or mold.

Other process steps that may be carried out include applying labels or printing on the belt, touch grinding or machining one or more surfaces for a desired final effect or appearance, and flipping the belts that are made inverted to assume the upright orientation.

If it is desired to use different compounds for overcord and undercord, then the belts could be made the same by V-cutting the sleeve, or by square cutting followed by grinding the V-angles. Thus, all the belts can be made inverted or all upright, depending on the preferred manufacturing process. This would, of course mean the process does not achieve the reduced waste that is a prime reason for making CCL V-belts.

The notches on both sides of the belt are substantially equivalent, but they do not mirror each other. The processes required to produce the belts economically do not allow the top and bottom notch pitches to be perfectly equal. As such, the peaks and valleys of the top and bottom notches go in and out of phase with some periodicity. The periodicity or pitch may be dependent on belt circumference as one notch pattern bends inward and the other bends outward. The top to bottom notch orientation at any point of any belt is therefore usually random.

The adhesion gum, overcord and undercord compounds are preferably rubber formulations with a base elastomer chosen from ethylene-alpha-olefin copolymers. Suitable ethylene-alpha-olefin copolymers include poly(ethylene propylene), poly(ethylene butene), poly(ethylene pentene), and so forth, up to and including poly(ethylene octene). Suitable copolymers include any of the aforementioned that may also include one or more additional monomers such as a cure site diene monomer or other unsaturated component. The most notable example is ethylene-propylene-diene terpolymer elastomer (EPDM). Herein, all such ethylene-alpha-olefin based elastomers and blends thereof will be referred to as "ethylene elastomers" ("EE").

The rubber formulations for the adhesion gum, overcord and undercord compounds preferably include a metal salt of an $\alpha$-$\beta$-unsaturated organic acid. The metal salts of $\alpha$-$\beta$-unsaturated organic acids useful in the present invention are metal salts of acids such as, for example, acrylic, methacrylic, maleic, fumaric, ethacrylic, vinyl-acrylic, itaconic, methyl itaconic, aconitic, methyl aconitic, crotonic, alpha-methylcrotonic, ascorbic, cinnamic, and 2,4-dihydroxy cinnamic acids. These salts may be of zinc, cadmium, calcium, magnesium, sodium or aluminum, and are preferably those of zinc. The preferred metal salts of $\alpha$-$\beta$-unsaturated organic acids are zinc diacrylate and zinc dimethacrylate. The most preferred metal salt of unsaturated organic acid is zinc dimethacrylate. Amounts of the metal salt useful in the present invention depend on which component of the belt is formulated.

The rubber formulations for the adhesion gum, overcord and undercord compounds preferably include one or more reinforcing fillers. Preferred reinforcing fillers include silica and carbon black. The amount and type of filler depends on which component of the belt is formulated. In general, higher structure, smaller particle size fillers are more reinforcing and therefore preferred for obtaining the high modulus compounds useful in the invention.

The adhesion gum is preferably a very-high-modulus compound. Modulus may be measured by any suitable direct measurement such as ASTM D412 or ISO 37. Modulus may also be indicated by indirect measurements such as Shore Durometer, preferably either the A or D scale, as taught for example in ASTM D2240, or using the IRHD scale, as taught for example in ASTM D1415. MH (i.e., highest torque attained) on a cure rheometer test (e.g. the moving die rheometer as described in ASTM D5289) is also a good indicator of the very high modulus of the adhesion gum at elevated temperature. The adhesion gum preferably includes no short fiber reinforcements. Although short fibers are known to increase modulus dramatically, especially when their aspect ratio is high, this effect has not been found to be advantageous in the tensile cord layer of a CCL V-belt. The preferred adhesion gum is thus fairly isotropic in its physical properties. Preferably, the anisotropy of the adhesion gum, defined for example as with-grain/cross-grain modulus, is less than 2.0, or less than 1.5, or less than 1.2. For the adhesion gum, the amount of the metal salt of the $\alpha$-$\beta$-unsaturated organic acid may range from about 20 phr to about 50 phr, and are preferably from about 25 to about 35 phr. Phr refers to the number of parts per hundred parts of the rubber or elastomer component or components. The reinforcing filler for the adhesion gum is preferably mostly silica, with optionally some carbon black as well. Silica is often found to produce higher modulus than carbon black at a similar loading. The total levels of reinforcing filler may be in the range of from about 30 phr to about 200 phr, preferably from about 40 phr to about 100 phr. Silane, titanate, or zirconate coupling agents may also be used with the reinforcing fillers to further enhance the modulus and other physical properties of the compounds. Very high modulus adhesion gums may be formulated using the relevant teachings thereof set forth in U.S. Pat. Nos. 5,610,217 and 6,616,558 with the exception of the teachings on use of short or discontinuous fibers.

The preferred range for the modulus of the adhesion gum, based on the tensile stress at 10% elongation ("M10") determined in accordance with ASTM D412 at RT is greater than 500 psi (3.45 MPa). The preferred range for M10 of the adhesion gum at 125° C. (257° F.) is greater than 250 psi (1.72 MPa), or greater than 350 psi (2.41 MPa), or from 400 psi (2.76 MPa) to about 600 psi (about 4.14 MPa), in both the with-grain and cross-grain directions. The preferred modulus, indicated by the durometer hardness, is greater than about 90 Shore A, or greater than about 40 Shore D, or from 40 to 60 Shore D. Preferred MH values are greater than 80 in-lb. (9 N-m), or greater than 90 in-lb. (10 N-m) or greater than 100 in-lb. (11 N-m), or greater than 110 in-lb. (12 N-m), or in the range from 80 to 140 in-lb. (9-16 N-m), or 90 to 130 in-lb. (10-15 N-m), or 100 to 120 in-lb. (11-14 Nm), or 110 to 130 in. lb. (12-15 N-m). The MH may be measured at a temperature of 177° C. or higher, preferably at 198° C. or 200° C.

The overcord is preferably a lower modulus formulation than the adhesion gum. The overcord is preferably made anisotropic in properties by the addition of short fibers which are oriented by calendering, extrusion or other processing operation. The direction of orientation of the fibers is called the "with-grain" direction, and the direction orthogonal to the fibers is called the "cross-grain" direction. The overcord is preferably of a lower cross-grain modulus than the adhesion gum modulus, but it may be of a comparable or even greater modulus in the with-grain direction relative to the adhesion gum modulus due to the fiber. The important result is that the overcord is suitably flexible in the belt longitudinal direction (which will be the cross-grain direction of the compound) to withstand repeated flexing at the higher strains experienced by that portion of the belt as it wraps around sheaves during use. On the other hand the adhesion gum, being restricted to the region of the tensile cord layer, does not experience such severe strains and stresses during belt use. Therefore the adhesion gum modulus can be made very high indeed.

The undercord is also preferably a lower modulus formulation than the adhesion gum. The undercord is also preferably made anisotropic in properties by the addition of short fibers which are oriented by calendering, extrusion or other processing operation so that the with grain direction is aligned across the width of the belt. The undercord formulation may be the same as the overcord formulation. When the overcord and undercord are the same formulation and both oriented transverse to the cord direction in the belt, the individual belts cut from the same belt sleeve in inverted and upright orientations will have matching constructions (as illustrated in FIG. 5).

The preferred range for the M10 of the overcord and undercord at room temperature ("RT") is greater than 100 psi (0.69 MPa), or greater than 200 psi (1.38 MPa), or greater than 300 psi (2.07 MPa), or greater than 400 psi (2.76 MPa), in the cross-grain direction and greater than 200 psi (1.38 MPa), greater than 400 psi (2.76 MPa), greater than 600 psi (4.14 MPa), or greater than 900 psi (6.21 MPa), in the with-grain direction. Thus, the anisotropy ratio based on M10 at RT for the overcord and undercord is preferably greater than 2.0, greater than 2.5, or about 3 or greater than 3.0. The preferred range for M10 of the overcord and undercord at 125° C. is greater than 50 psi (0.35 MPa), greater than 100 psi (0.69 MPa), greater than 200 psi (1.38 MPa), or greater than 250 psi (1.72 MPa), or up to about 200 psi (about 1.38 MPa), 400 psi (2.76 MPa), or 600 psi (4.14 MPa), in the cross-grain direction and greater than 100 psi (0.69 MPa), greater than 200 psi (1.38 MPa), greater than 500 psi (3.45 MPa), or greater than 600 psi (4.14 MPa), in the with-grain direction. Thus, the anisotropy ratio based on M10 at 125° C. for the overcord and undercord is preferably greater than 2.0, greater than 2.5, or about 3 or greater than 3.0. The preferred modulus for overcord and undercord, indicated by the durometer hardness at RT, is greater than about 75, 80, 85, or 90 Shore A, or greater than about 30 or 40 Shore D, or from 40 to 60 Shore D. The preferred modulus for overcord and undercord, indicated by the durometer hardness is a few points less, or from 3 to 20 points less, or from 5 to 10 points less than that of the adhesion gum. Preferred MH values are less than 80 in-lb. (9 Nm), or less than 70 in-lb. (8 Nm) or less than 60 in-lb. (7 Nm), or less than 50 in-lb. (6 Nm), or in the range from 20 to 80 in-lb. (2-9 Nm), or 25 to 70 in-lb. (3-8 Nm), or 30 to 60 in-lb. (3-7 Nm). The MH may be measured at a temperature of 177° C. or higher, preferably at 198° C. or 200° C.

Short fibers useful in the overcord and undercord compounds may be of any conventional or suitable material or form, including for example materials such as cotton, kenaf, wood, rayon, polyester, aramid, carbon (including nanotubes), polyimide, polyvinyl alcohol, nylon and fiberglass; and in forms including staple or chopped fibers, and pulped or flocked fibers. The fibers may optionally be treated with sizing, an adhesive, or other conventional and/or suitable fiber treatments as are known in the art. Preferred fibers are cotton, nylon, polyester and aramids. Most preferred is cotton. The level needed should be readily discernable by the skilled practitioner in view of the levels of reinforcing fillers and other ingredients. In general, the amount of fiber may range from about 1 phr to about 75 phr, or from about 10% up to about 20% by volume. Short fiber lengths may range up to about 7 mm. Some natural staple fibers may have longer lengths. Chopped synthetic fibers typically are useful in the range of 1 to 3 mm.

The undercord and overcord formulations may also utilize the relevant teachings set forth in U.S. Pat. Nos. 5,610,217 and 6,616,558 including the teachings on use of short or discontinuous fibers.

The adhesion gum, overcord and undercord compounds may include: other elastomers blended at less than 50%, preferably less than 20%, of the total elastomer by weight; other reinforcing and non-reinforcing fillers; process aids and dispersion aids; anti-degradants; plasticizers, softeners, and oils; coagents; curatives; and the like, as long as the desired properties are obtained.

Any suitable cure system may be used for the adhesion gum, overcord and undercord, and they may all be similar for maximum compatibility and adhesion. Preferably the compound is cured with an organic peroxide or other free-radical promoting material, optionally in the presence of a minor amount of sulfur in a mixed cure system. Suitable peroxides for curing ethylene elastomers include for example, dicumyl peroxide, bis-(t-butyl peroxy-diisopropyl benzene, t-butyl perbenzoate, di-t-butyl peroxide, 2,5-dimethyl-2,5-di-t-butylperoxyhexane, α-α-bis(t-butylperoxy) diisopropylbenzene. The preferred organic peroxide curative is α-α-bis(t-butylperoxy) diisopropylbenzene. Cure-effective amounts of organic peroxide for purposes of the present invention are typically from about 2 to about 10 phr. Preferred levels of organic peroxide are from about 4 to about 6 phr. Sulfur may optionally be added to the organic peroxide curative as part of a mixed cure system in an amount of from about 0.01 to about 1.0 phr.

Flexibility or flex resistance of the compounds may be measured in accordance with the DeMattia fatigue test as described in ASTM D430 Method B, or the pierced DeMattia crack growth test of ASTM D813. Flex life measured in Kilocycles ("kcycles") for an initial crack to grow to one inch (the width of the specimen) may be used as a relative indicator of compound performance under flex.

The compounds may be mixed according to known methods. For example they may be mixed in an internal mixer, finished on a mill, and calendered to a desired width and thickness for orienting the fiber and for building V-belts on a mandrel. Typical cure temperatures and pressures may be used.

An example formulation for adhesive gum and for both the overcord and undercord is shown in TABLE 1, with amounts given in phr. Some properties of the compounds are listed in TABLE 2. In TABLE 2, Tb is the tensile stress at break and Eb is the elongation at break per ASTM D412, die-C, pulled at 6 in./min (150 mm/min). In addition to the listed properties, the DeMattia crack growth test was run on the overcord/undercord compound at 300 cpm, 0.5" (1.27 cm) stroke, at 125° C., w/g. The same test was repeated on the overcord compound minus the cotton fiber. The mean flex life with fiber was about 5 kcycles/in., and without fiber about 19 kcycles/in. This illustrates that it can be advantageous to omit fiber from the adhesion gum when it is a very much higher modulus formulation, and to reduce the modulus of the fiber-loaded overcord/undercord compound.

TABLE 1

| Ingredients | Adhesion Gum | Overcord/ Undercord |
| --- | --- | --- |
| Ethylene elastomer | 100 | 100 |
| Silica | 62.4 | — |
| Carbon Black | 3 | 60 |
| Cotton Fiber | — | 39.8 |
| Zinc Dimethacrylate | 29.9 | 11.6 |
| Oil (Paraffinic) | — | 10 |
| Zinc Oxide | 5 | — |
| Anti-Oxidant | 7 | 1 |
| Dispersion Aid | 7 | — |
| Peroxide curative[1] | 6.3 | 5 |
| scorch retarder | 0.6 | 0.3 |
| Total | 221.2 | 227.7 |

[1] 40% active ingredient.

TABLE 2

| Properties | Adhesion Gum | Overcord/ Undercord |
| --- | --- | --- |
| Durometer (Shore A) | 97 | 93 |
| Durometer (Shore D) | 54 | 47 |
| MH at 200° C. (in.-lb.) | 111 | 35 |
| M10 at RT (psi) (wig) | 872 | 1485 |
| Tb at RT (psi) (w/g) | 2623 | 2170 |
| Eb at RT (%) (w/g) | 196 | 322 |
| M10 at RT (psi) (x/g) | 848 | 502 |
| Tb at RT (psi) (x/g) | 2814 | 1669 |
| Eb at RT (%) (x/g) | 215 | 311 |
| M10 at 125° C. (psi) (w/g) | 350 | 831 |
| Tb at 125° C. (psi) (w/g) | 992 | 894 |
| Eb at 125° C. (%) (w/g) | 124 | 15 |

TABLE 2-continued

| Properties | Adhesion Gum | Overcord/ Undercord |
| --- | --- | --- |
| M10 at 125° C. (psi) (x/g) | 389 | 270 |
| Tb at 125° C. (psi) (x/g) | 1193 | 653 |
| Eb at 125° C. (%) (x/g) | 131 | 174 |

Example ("Ex.") CCL V-belts were made as described herein in connection with FIG. 5. The belts were so-called "B-section" belts of 42-inch (107 cm) nominal length, outside circumference 45 inches (114 cm). The example belts were constructed with the afore-mentioned compounds and with polyester tensile cords (S twist, with approximately 0.050" (1.27 mm) diameter at 16.5 cords per inch). Ex. 1 was constructed without notches according to the embodiment of FIG. 1. The total thickness of calendered adhesion gum making up the tensile cord layer was 0.024 inches (0.061 cm). The overall thickness of the Ex. 1 belts was 0.39 in. (9.9 mm). Ex. 2 was constructed like Ex. 1, but with the thickness of adhesion gum at 0.060 inches (0.152 cm). The overall thickness of the Ex. 2 belts was 0.36 in. (9.1 mm).

Ex. 4 is an inventive CCL V-belt made with dual notches according to the embodiment of FIG. 4. The overall thickness of the Ex. 4 belts was 0.43 in. (10.9 mm).

For comparison with the inventive belts, Comparative Example ("Comp. Ex.") belts were also made or obtained. Comp. Ex. 3 was a CCL V-belt like Ex. 1 and Ex. 2 but made entirely with the above mentioned overcord/undercord formulation, i.e., without the very high modulus adhesion gum. Likewise, Comp. Ex. 5 was a CCL V-belt like Ex. 4 but made entirely with the above mentioned overcord/undercord formulation, i.e., without the very high modulus adhesion gum.

Comp. Ex. 6 was a conventional commercial B42 fabric-wrapped V-belt sold under the trademark Hi-Power® II by Gates Corporation. Comp. Ex. 6 was flat like FIG. 1, i.e., with no notches. The polyester tensile cord in Comp. Ex. 6 is positioned in the top ⅓ of the belt body, so it is not a CCL belt. Comp. Ex. 7 was a raw edge laminated CCL V-belt sold under the trademark Carlisle® Super II by The Timken Company. Comp. Ex. 7 was a B62 construction with outside circumference of 65 inches (165 cm). Therefore, the belt test results for Comp. Ex. 7 had to be adjusted to an equivalent length basis for comparison to the other examples, using the life-length 2.75 power-law relationship of SAE J637. Comp. Ex. 7 is advertised as being superior to wrapped V-belts. Thus, Comp. Ex. 6 and Comp. Ex. 7 represent state-of-the-art commercial belts.

Three different belt tests were carried out to assess the performance of the inventive belts. The tests were a load durability test, a flex test and a stability test. Not all tests have been completed for all example belts. The results of these tests are reported in TABLE 3. For the first 5 examples, both inverted and upright belts from the building and cutting process were tested. Inverted belts are expected to outperform upright built belts on the flex test because the back side idler is the most severe bending stress causer in the tests.

Figure 6:
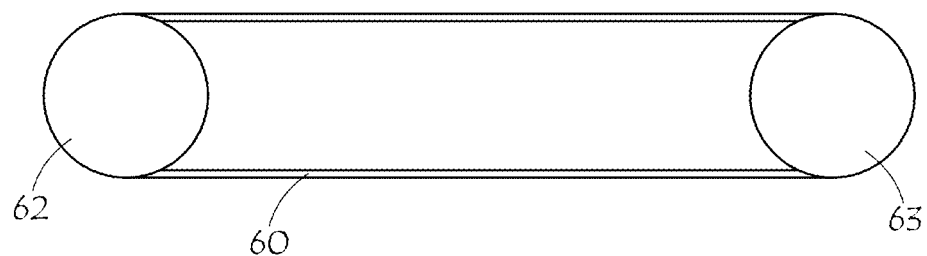
FIG. 6 is a schematic of a layout of a load test used to characterize the invention.

The load test, illustrated in FIG. 6, was a two-point test, with belt 60 trained around 4.75-inch (12.1 cm) diameter driver 62 and driven 63 sheaves, run at room temperature, 1750 rpm, and at two different load conditions. The first load condition was run with 262 lb. (1170 N) total tension and a load of 10 hp (7.5 kW). The second load condition was run with 313 lb. (1390 N) total tension and a load of 12 hp (8.9 kW). The load tests are greatly accelerated by using a significantly higher hp and a significantly higher tension than would be recommended for the belt in actual practice. Also, a 10% increase in hp is expected to reduce the belt life in half, as a first approximation. For comparison, the recommended maximum hp for Comp. Ex. 3 is about 3.8 hp (2.8 kW) at about 70 lb. (310 N) total tension.

Figure 7:
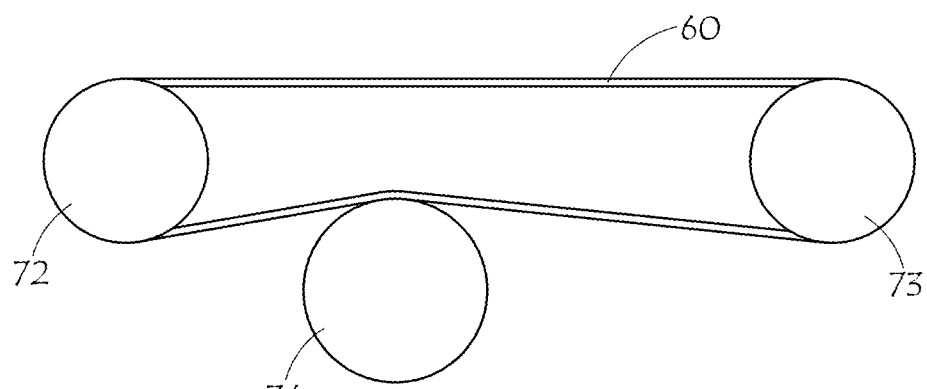
FIG. 7 is a schematic of a layout of a flex test used to characterize the invention.

The flex test, illustrated in FIG. 7, was run on 4.75-inch (12.1 cm) diameter driver 72 and driven 73 sheaves, with a 5-inch (12.7 cm) diameter flat back side idler 74, at room temperature, at 3600 rpm, 50 lb. (220 N) total tension, and no load. The flex test is greatly accelerated by using a significantly smaller idler diameter than recommended for actual use of the belt. The minimum back side idler diameter recommended by ARPM standards for these belts is about 7.7 inches (about 19.6 cm).

Figure 8:
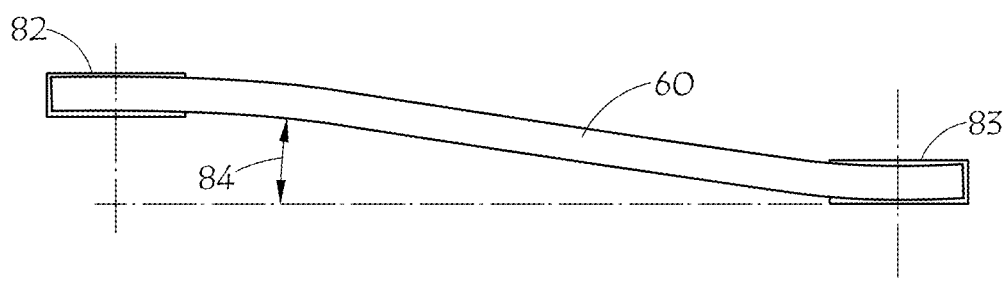
FIG. 8 is a schematic of a layout of a stability test used to characterize the invention.

The stability test, illustrated in FIG. 8, involves increasing a misalignment angle 84 until the belt 60 rolls over. The layout for the stability test is a two-point test, run at room temperature on 6.75-inch (17.1 cm) diameter pulleys 82 and 83, at room temperature, at 700 rpm and 260 lb. (1160 N) total tension. The pulley axes are parallel, but one pulley 82 is displaced along its axis until the belt 60 fails by turning over. The misalignment angle 84 at turnover indicates the stability of the belt.

The available results of the belt testing are shown in TABLE 3. Several comparisons can be made from this data. First compare the effect of the adhesion gum thickness. The thicker adhesion gum found in Ex. 2 gives Ex. 2 better performance than Ex. 1 on the 12 hp (8.9 kW) and 10 hp (7.5 kW) load tests. These tests run at high tension and therefore require good transverse stiffness, which is provided by the adhesion gum in the tensile cord layer. Both thickness levels perform well on the flex test which does not cause as much transverse stress, but requires longitudinal flexibility, which is provided by the lower modulus overcord and undercord. Adding notches in Ex. 4 results in the best flex test results, but somewhat shorter life on the 10 hp (7.5 kW) load test. The 12 hp (8.9 kW) test is simply unrealistic for some of these belt constructions.

Likewise, comparing the belts with adhesion gum (Ex. 1, 2, and 4) to the belts without adhesion gum (Comp. Ex. 3 and 5) shows that inventive belts with adhesion gum usually result in somewhat better performance.

Finally, the inventive CCL V-belts (Ex. 1, 2, and 4) compare very favorably to the commercial state-of-the-art belts, Comp. Ex. 6 and 7.

TABLE 3

| Ex. No. | Construction | 12 HP Load test | 10 HP Load test | Flex test | Stability test |
|---|---|---|---|---|---|
| Ex. 1 | CCL inverted w/0.024" adh. gum | 2 | NA[1] | 594 | 5.8 |
| " | CCL upright w/0.024" adh. gum | 1 | 544 | 102 | 6.1 |
| Ex. 2 | CCL inverted w/0.060" adh. gum | 29 | 1148 | 1030 | 4.7 |
| " | CCL upright w/0.060" adh. gum | 28 | NA | 46 | 5.3 |
| Comp. Ex. 3 | CCL inverted w/o adh. gum | 30 | 140 | 522 | 6.7 |
| " | CCL upright w/o adh. gum | 31 | 183 | 83 | 7.4 |
| Ex. 4 | Notched CCL 0.06" gum, inverted | 0.7 | 227 | 1229 | 5.3 |
| " | Notched CCL 0.06" gum, upright | 0.7 | 344 | 1213 | 4.9 |
| Comp. Ex. 5 | Notched CCL no gum, inverted | 0.4 | 6 | 506 | 5.1 |
| " | Notched CCL no gum, upright | 0.3 | 32 | 621 | 4.9 |
| Comp. Ex. 6 | Hi-Power II wrapped, hi-cord | NA | 67 | 108 | 3.2 |
| " | " | NA | 44 | 65 | 2.6 |
| Comp. Ex. 7 | Super Power II CCL laminated | 21 | NA | NA | NA |

[1]NA = not available, i.e., not tested.

The inventive CCL-V-belts thus provide a number of advantages. By avoiding the usual fabric laminations or wraps, the manufacturing is made simpler and the material cost is reduced. By applying the high-modulus materials described herein, the performance can be unexpectedly equal to or even better than conventional laminated or wrapped V-belts. Thus, the reputation for poor quality for CCL V-belts is surprisingly overcome.

By molding notches into both sides of the CCL V-belt, the strain levels are further reduced during flexing and the material cost further reduced. At the same time, the use of fabric is still avoided. Double Notch CCL V-belts have better performance than conventional banded (wrapped) V-belts.

It may be recognized by one of skill in the art that the reason the inventive belts perform well on load and flex tests is an optimal combination of axial stiffness and longitudinal flexibility. A belt requires a certain axial stiffness to be able to carry load. The tensile cord provides most of the tensile strength for application of torque to a pulley, but the cord requires a "bridge" across the V pulley to support it. If not fully supported, the edge cords will elongate much more than the cords in the center resulting in earlier belt failure. So for pure load carrying, very stiff elastomeric materials are required.

However, a belt must also flex in its running (longitudinal) direction. As such, very stiff belts will be less efficient due to hysteretic loss, and they will fail sooner due to higher belt operating temperatures. So what is needed is a belt that has a high ratio of axial to longitudinal stiffness. And not only is the ratio important. There will also be a minimum required axial stiffness as well as a maximum allowable bending stiffness.

One means of delivering axial stiffness (or transverse rigidity) and longitudinal flexibility is to apply elastomeric materials with anisotropic properties. When properly aligned through calendering and cutting/turning, short fiber reinforced elastomers can yield distinctly orthotropic materials moduli. Traditionally, this means has been relied on for the bulk of the axial stiffness. Here, this means is applied in the overcord and undercord in a way that maintains good flexibility. Then a second means of gaining axial stiffness is also applied, namely the adhesion gum. The traditional function of these gums is to merely flow around and adhere to the tensile cords. In this invention, the adhesion gum is an ultra-high modulus material in a narrow band around the cord line. Thus this material provides a much greater share of the axial stiffness of the belt than in conventional belts, while at the same time, keeping the high stiffness material very near the neutral axis of the belt. As such, the ultra-high modulus material will never experience high strains that might cause hysteretic losses, but it will still provide sufficient axial stiffness. The result is a better balance of flexible elastomeric materials in overcord and undercord areas of the belt farther from the neutral axis. The result is a belt with good load durability and flexibility. The result is a belt with good energy efficiency and low hysteretic losses or heat buildup. The use of the EE materials also can result in very high heat resistance (potentially up to 285° F. or 140° C. operating temperatures) compared to traditional elastomers like polychloroprene or styrene-butadiene rubber.

Thus the invention relates to:
- A belt that has sufficient axial stiffness (tensile cord support) to be able to efficiently carry load well while still having a low longitudinal bending stiffness.
- A belt wherein the ratio of axial stiffness to bending stiffness (or loss) is maximized. Measurements of such a ratio are planned.
- A belt wherein much of the axial stiffness is supplied by a thin layer of very high modulus elastomer (i.e. adhesion gum) surrounding the tensile cord. The thickness of this tensile cord layer is preferably between 1 mm and 5 mm (including the tensile cord and the adhesion gum). The thickness of this layer may also be specified in multiples of the cord diameter or specified as a percent of the overall belt thickness. In the overcord and undercord of the belt, the remainder of the belt may be composed of a more flexible material to minimize bending stiffness.

Preferably the tensile cord is positioned at the centerline of the belt.

The belt may be notched on one or both sides.

Any combination of the features described herein may be applied.

The inventive V-belt construction described herein is useful in a wide variety of V-belt applications. It should be recognized that this construction can also be used as the base belt body for other types or styles of V-belts, such as a fabric-wrapped V-belt (banded V-belt). The inventive construction could also be used as the basis for power bands, i.e., multiple V-belts banded together. It could also be used for variable speed V-belts.

If one is willing to forgo the manufacturing advantages, the belt materials described herein could be applied to a high cord-line V-belt.

In another series of tests, it is found that the inventive belt construction results in higher efficiency or more efficient belt performance than other V-belt constructions. In this test, the layout was as shown in FIG. 6, with pulleys 62 and 63 having an outside diameter of 5.75" and a pitch diameter for B-section belt of 5.40". The driver was run at 1770 RPM with no applied torque. During the power loss test, the average load, average driver speed and average driver torque were measured. First, the parasitic torque of the drive or bearing loss was determined by running a very thin, small belt at each hub load. Then the various example belts were run and the bearing loss subtracted to determine the power loss due to the belt construction at a given hub load. The power loss determined is reported in Table 4 in units of mW (milliwatts). The inventive CCL belt, whether cut inverted or upright, runs with significantly less power loss than either of the conventional, comparative-example belts.

Figure 9:
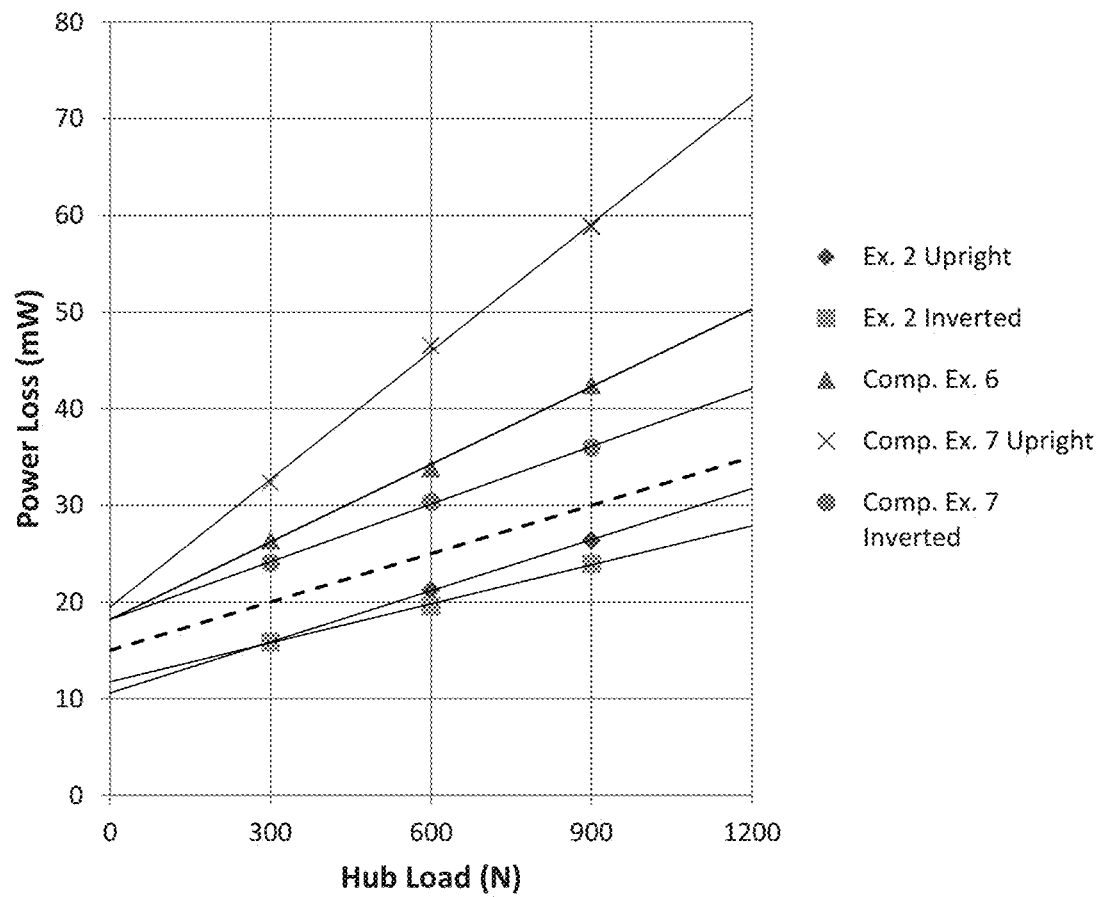
FIG. 9 is a graph of power loss versus belt tension for example belts.

The power loss is plotted versus the hub load in FIG. 9, where it is clear that the data in Table 4 for each belt is well fit by a straight line. The lines for Ex. 2 fall well below the lines for the comparative examples. A dashed line separating the inventive belts from the comparative belts may be given by equation 1:

Power Loss(mW)=Hub Load(N)/60(mW/N)+15 (mW).

Thus the inventive belts may be characterized by the design region described by the inequality: Power Loss (mW)<Hub Load (N)/60 (mW/N)+15 (mW). This result was generated for B-section V-belts of nominal ⅝-inch top width and 45-inch length, but is expected to apply at least approximately for other V-belt sections, lengths and sizes if measured on appropriately scaled, test layouts. The term "section" refers to the cross-sectional shape or profile of the belt, as is well-known in the art.

TABLE 4

| | Power Loss (mW) | | | |
|---|---|---|---|---|
| Ex. No. | Construction | 300N Hub Load | 600N Hub Load | 900N Hub Load |
| Ex. 2 | CCL upright w/0.060" adh. gum | 15.8 | 21.2 | 26.4 |
| " | CCL inverted w/0.060" adh. gum | 15.9 | 19.6 | 24.0 |
| Comp. Ex. 6 | Hi-Power II wrapped, hi-cord | 26.4 | 33.8 | 42.5 |
| Comp. Ex. 7 | Super Power II CCL Upright | 32.4 | 46.5 | 58.8 |
| " | Super Power II CCL Inverted | 24.0 | 30.4 | 36.0 |

Again, in summary, the inventive V-belts have a center cord line so they can be cut from the slab they are made in without waste, half then are used inverted and half upright. The inventive belts have a very high-modulus adhesion gum layer at the cord line, and a lower modulus material both below and above the cordline. The inventive belts have no additional fabric or textile reinforcement layers. Yet the inventive belts can perform better on load-life tests and flex tests than wither conventional wrapped V-belts with higher cord lines or fabric reinforced CCL V-belts. Moreover, the inventive CCL V-belts can exhibit lower power loss than the conventional V-belts.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A center cord-line V-belt comprising a radially centered cord line of helically wound tensile cord embedded in a very high-modulus adhesion gum;
   an overcord layer; and
   an undercord layer;
   wherein the adhesion gum comprises a substantially isotropic modulus;

the overcord and undercord layers comprise unequal with-grain and cross-grain moduli; and the overcord and undercord cross-grain moduli are less than the adhesion gum modulus.

2. The center cord-line V-belt of claim 1 wherein the modulus of the very high-modulus adhesion gum as indicated by a value of MH on a moving die cure rheometer at 177° C. or more is greater than 80. in.-lb. or 9.0 N-m.

3. The center cord-line V-belt of claim 2 wherein the moduli of the overcord and the undercord as indicated by a value of MH on a moving die cure rheometer at 177° C. or more is less than 80. in.-lb. or 9.0 N-m.

4. The center cord-line V-belt of claim 1 wherein the anisotropic moduli of the overcord and the undercord are the result of oriented short fibers and the with-grain modulus is oriented axially in the belt.

5. The center cord-line V-belt of claim 4 wherein the anisotropic modulus of the overcord and the undercord are indicated by a with-grain over cross-grain modulus greater than 2.0.

6. The center cord-line V-belt of claim 1 wherein the adhesion gum has no short fiber.

7. The center cord-line V-belt of claim 1 wherein the substantially isotropic modulus of the adhesion gum is indicated by a with-grain over cross-grain modulus less than 2.0.

8. The center cord-line V-belt of claim 1 which has no reinforcing fabric layer and no fabric wrap.

9. The center cord-line V-belt of claim 1 wherein the adhesion gum, overcord layer and undercord layer are based on an ethylene-alpha-olefin elastomer, with peroxide cure, reinforcing filler, and metal salt of a a-p-unsaturated organic acid.

10. The center cord-line V-belt of claim 1 comprising notches on one or both of the inner and outer radial surfaces.

11. The center cord-line V-belt of claim 1 wherein the power loss measured in mW on a two-point, no-torque tester is in the range of less than or equal to the Hub Load in Newtons divided by 60 plus 15 mW.

12. The center cord-line V-belt of claim 6 which has no reinforcing fabric layer and no fabric wrap.

13. The center cord-line V-belt of claim 3 wherein the power loss measured in mW on a two-point, no-torque tester is in the range of less than or equal to the Hub Load in Newtons divided by 60 plus 15 mW.

14. The center cord-line V-belt of claim 1 wherein the anisotropic modulus of the overcord and the undercord is indicated by a with-grain over cross-grain modulus ratio greater than 2.0; the adhesion gum has no short fiber; and the substantially isotropic modulus of the adhesion gum is indicated by a with-grain over cross-grain modulus ratio less than 2.0.

* * * * *